DATA TRANSCEIVER

Filed June 27, 1967 3 Sheets-Sheet 1

INVENTOR.
TERRY L. Z. WILSON
BY Flehr, Hohbach, Test, Albritton & Herbert
ATTORNEYS INVENTOR.
TERRY L. Z. WILSON
BY Flehr, Hohbach, Test, Albritton & Herbert
ATTORNEYS Oct. 20, 1970 T. L. Z. WILSON 3,535,456

DATA TRANSCEIVER

Filed June 27, 1967 3 Sheets-Sheet 3

INVENTOR.
TERRY L. Z. WILSON
BY Fleher, Hohbach, Test, Albritton & Herbert
ATTORNEYS United States Patent Office 3,535,456

Patented Oct. 20, 1970

3,535,456

DATA TRANSCEIVER

Terry L. Z. Wilson, Sunnyvale, Calif., assignor to Tymshare, Inc., Los Altos, Calif., a corporation of California Filed June 27, 1967, Ser. No. 649,244
Int. Cl. H04m 11/00
U.S. Cl. 179—2 1 Claim

ABSTRACT OF THE DISCLOSURE

A data transceiver for use with a data transmission system having a typical teleprinter code using two frequencies for send and two frequencies for receive. The transceiver is coupled into a telephone headset; in the case of the microphone, acoustically, and in the case of the receiver, magnetically. The transmitter portion includes a tuned amplifier having regenerative feedback means including a twin-T type filter whose filter characteristics are changed between the two pertinent send frequencies. The receiver portion also includes both broad and narrow tuned amplifiers also formed by a negative feedback consisting of twin-T filters. The receiver processes only a single "space" frequency, the last stage of the receiver portion of the transceiver reforming the "space" into a typical mark-space two-level DC code.

Figure 1:
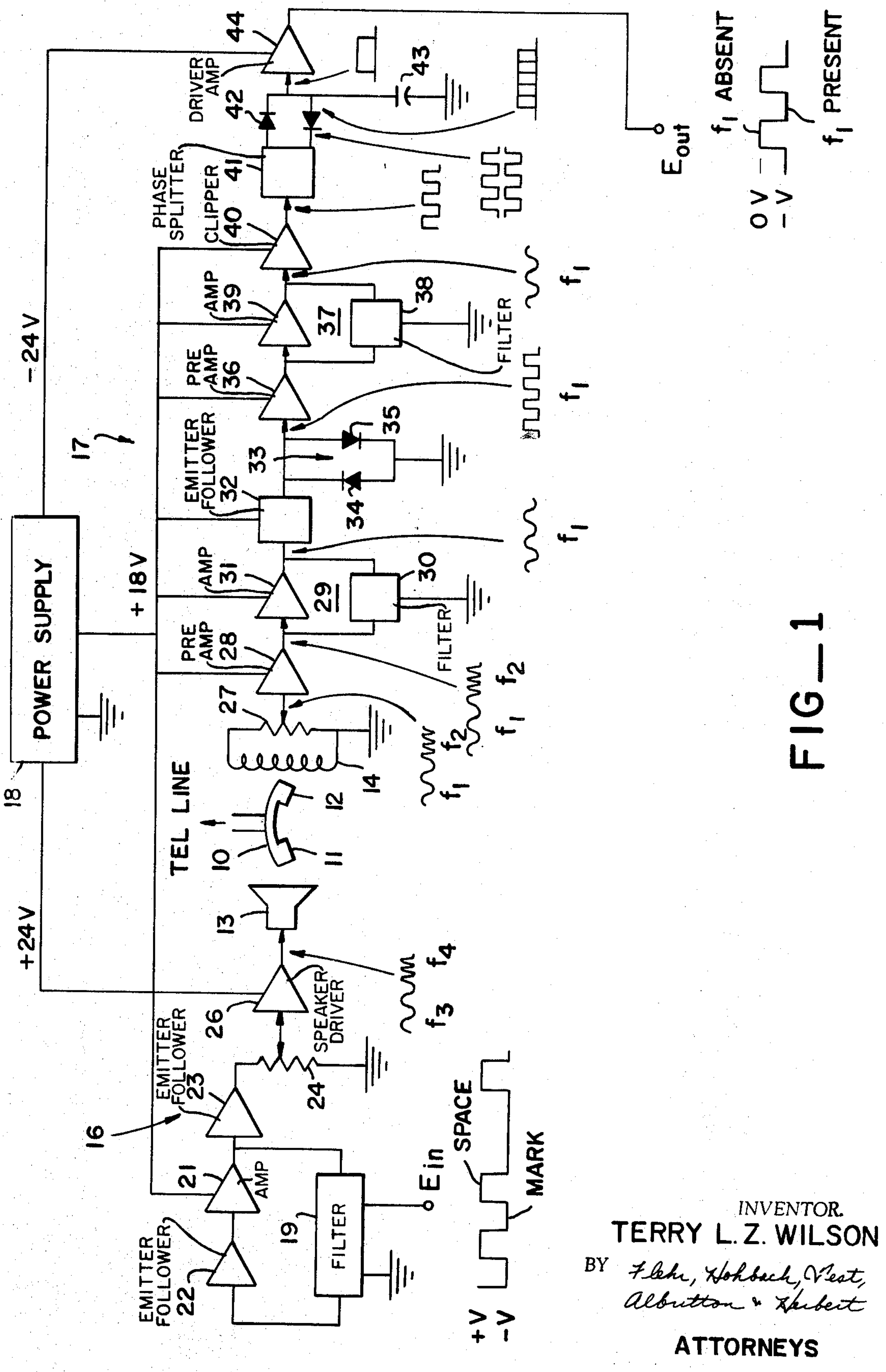

The present invention is directed to a data transceiver and more specifically to a transceiver for use with a data transmission system having signal pulses of two different frequencies for both send and receive.

A central computer may be linked to several remote data stations by means of, for example, special lines and equipment provided by the telephone company. The data code for this service is a standardized two frequency code in which a first pair of pulses is used for the sending of information and a second pair of pulses having a different set of frequencies is used for receiving information.

In coupling the telephone line to the necessary data sources, a direct wire connection has been used. This unduly limits both the number of data sources and the flexibility of their location.

It is a general object of the present invention to provide an improved data transceiver which is easily coupled to a data transmission system.

It is another object of the invention to provide a data transceiver of the above type which has flexibility of location.

It is another object of the invention to provide a data transceiver which is relatively immune from noise in the data transmission system.

Additional objects will appear from the following description.

In accordance with the above objects there is provided a data transceiver for the above described data transmission system which has signal pulses of first and second frequencies for receiving and third and fourth frequencies for transmitting. An improved receiver portion of the transceiver includes at least one amplifier stage which is tuned to only one of the above frequencies. The amplifier includes negative feedback means comprising a filter network which passes substantially all frequencies except the one frequency to thereby tune the amplifier to this one frequency. Additionally, the improved data transceiver also includes an improved transmitter portion which has an amplifier stage with feedback means which include a filter network and means for tuning this filter network between the third and fourth frequencies. This causes the amplifier to oscillate at either of the two frequencies to produce the required signal for the data transmission system.

Figure 2A:
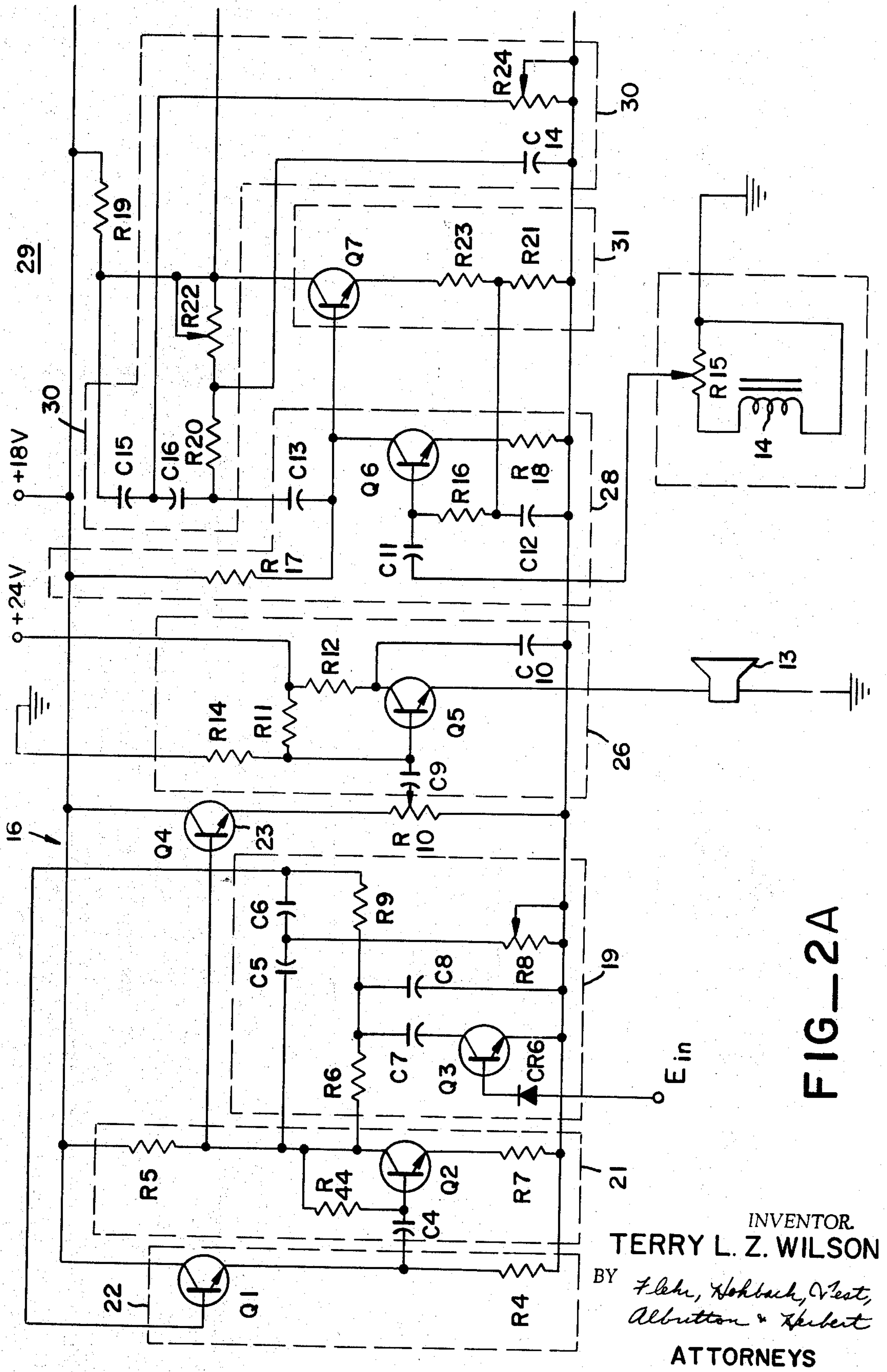
Figure 2B:
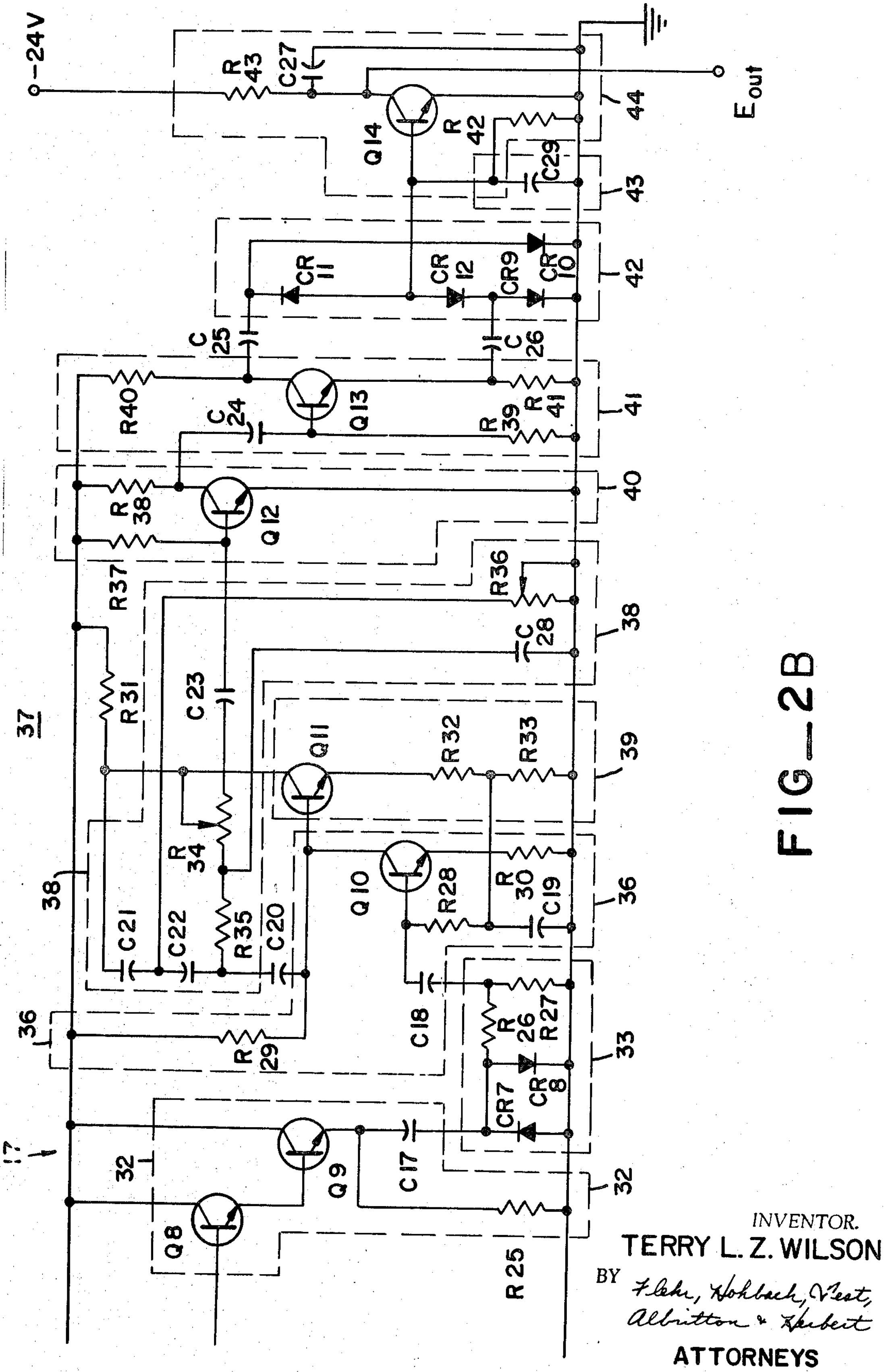

Referring now to the drawings:

FIG. 1 is a block diagram of a transceiver incorporating the present invention; and FIGS. 2A and 2B are a detailed schematic of the block diagram of FIG. 1.

The block diagram of FIG. 1 illustrates the transceiver as it would be coupled to a telephone line through a telephone headseat 10 having a microphone 11 and a receiver 12. Microphone 11 is in close proximity to a speaker 13 of the transceiver, and similarly receiver 12 is in close proximity to a pick-up coil 14 which magnetically senses the output of telephone receiver portion 12. Alternatively, an acoustic pick-up could satisfactorily be used.

Generally, the transceiver, as its name implies, includes a transmitter portion 16 and a receiver portion 17 which are coupled to a common power supply 18. Power supply 18 supplies typical voltages as indicated.

The transmitter portion 16 of the transceiver has an input, designated $E_{in}$, which, as illustrated, is a typical mark and space teleprinter pulse code where the "mark" part of the code is at negative voltage and the space at a predetermined positive voltage. This teleprinter code may be used, for example, with an American Telephone and Telegraph Company teletype printer. The $E_{in}$ input is coupled to a filter network 19, preferably of the "twin-T" type, to be discussed in detail below, which is in a feedback path between the input and output of an amplifier 21. Series connected in the input of the amplifier between filter 19 and amplifier 21 is an emitter follower amplifier 22 which acts as a buffer to keep from loading the filters. Filter 19 is a "notch" type filter; it provides negative feedback at all but one frequency. The amplifier gain is sufficient to give oscillation at that one frequency. Thus, regenerative feedback occurs only at the reject frequency of the filter and the amplifier will serve as an oscillator only at that frequency. As will be discussed in greater detail below, the two-level DC $E_{in}$ input to the filter causes it to shift its "notch frequency" between a frequency, $f_3$, and a frequency, $f_4$, thus shifting the oscillation of the amplifier between these two frequencies. This oscillating output is coupled through an emitter follower 23 at the output of amplifier 21 through a gain control 24 to a speaker driver 26 which drives speaker 13.

Referring now to the receiver portion 17 of the transceiver of FIG. 1, the pick-up coil 14 of receiver 12 of the telephone headset 10 is coupled into a gain control 27, and thereafter, to a preamplifier 28 and a tuned amplifier 29. The tuned amplifier is tuned to receive only one of the two frequencies received by receiver 12 which will be designated $f_1$ and $f_2$. As was discussed above, in the standard data transmission system, two different frequencies are used for the transmission of data, $f_3$ and $f_4$, in order to prevent the mixing of the two different frequency pairs. However, frequencies $f_1$ and $f_2$ still correspond respectively to the space and mark intervals of a typical teleprinter code.

More specifically, tuned amplifier 29 is tuned only to the single frequency, $f_1$, by means of a twin-T type filter 30 in a negative feedback path between the output of amplifier section 31 and its input. Thus, as illustrated by the waveforms, the input to amplifier 28 includes both frequency components $f_1$ and $f_2$, as does the input to tuned amplifier 29. However, the output of tuned amplifier 29 has filtered out of it the $f_2$ component, leaving only the $f_1$ frequency component. This frequency component is representative of the space interval of a teleprinter code and the duration of the $f_1$ signal determines the duration of the corresponding space code portion.

The output of tuned amplifier 29 is coupled to an emitter-follower 32 for buffering purposes and thereafter the output of the emitter-follower 32 is coupled into a clipper circuit 33 having obversely connected diodes 34 and 35. This provides limiting and produces clipped rectangular waveform as illustrated. The clipped waveform is amplified by preamplifier 36 and fed into a second tuned amplifier 37 which is of similar construction to tuned amplifier 29 including an amplifier section 39, but is more critically tuned by means of adjustment of its twin-T type filter 38 to provide for greater selectively of the $f_1$ signal. In other words, relatively speaking, tuned amplifier 29 is broad tuned to the $f_1$ frequency, whereas tuned amplifier 37 is narrowly tuned. The output of tuned amplifier 37, as illustrated, is a waveform of constant amplitude of frequency $f_1$ and this is coupled into a clipper circuit 40 to provide again a rectangular waveform as illustrated. The output of the clipper is coupled to a phase splitter 41 to provide complementary waveforms as shown. These waveforms are fed into a fullwave rectifier, schematically illustrated at 42, to provide a unidirectional output which is integrated by an integrator or filter 43 which smooths out the ripple in the unidirectional output. The duration of this unidirectional output determines the space portion of the teleprinter code which is coupled through a switch driver amplifier 44 and is labelled $E_{out}$. In actuality, the output would be a zero voltage indicating a space, and the absence of a space would be a negative voltage level which is the "mark" level of the teleprinter code.

FIGS. 2A and 2B show all of the components (excluding the power supply 18) of FIG. 1 in greater detail and the dashed blocks correspond to the equivalent blocks of FIG. 1. Referring first to the transmitter portion 16 of the circuit, the $E_{in}$ input is coupled into twin-T filter 19 through a series connected diode CR6 into the base of the transistor Q3. Generally, the twin-T filter comprises resistors R6 and R9 which form the top of the "T." The legs of the twin-T are formed by capacitors C7 and C8 which, in a normal twin-T filter, would go to ground, and series connected capacitors C5 and C6 which are joined together and grounded through a resistive potentiometer R8. The purpose of the potentiometer R8 is to make a fine adjustment in the filter response. However, in accordance with the invention, there is inserted between ground and capacitor C7 a transistor Q3. The twin-T filter generally is a band reject or notch type filter in which the notch frequency is determined by the following relationships:

$R8 = \frac{1}{2} R6.$
$R6 = R9.$
$C8 = 2C5.$
$C5 = C6.$

By adding the capacitor C7 when transistor Q3 is in a saturated state, the twin-T filter is shifted to a lower notch reject frequency. Thus, the $E_{in}$ input provides for generation of two separate frequencies. The amplifier section of the transmitter includes transistor Q2 with associated resistors R5, R7 and R44. The emitter-follower buffer 22 includes transistor Q1 and resistor R4 and is connected between the filter 19 and the input to the amplifier stage 21 which includes transistor Q2. Thus, the feedback path is completed which forms the oscillator which feeds into emitter-follower 23 and potentiometer 24. The speaker driver amplifier 26 includes transistor Q5 and associated resistors and capacitors to drive the speaker 13 as discussed above.

In operation, the transmitter portion of the transceiver receives the teleprinter code type input on the $E_{in}$ terminal which shifts the filter notch frequency of filter 19 between $f_3$ and $f_4$ causing the amplifier to selectively oscillate at both of these frequencies. Thus, the teleprinter code is connected to a two frequency code suitable for typical telephone transmission which is coupled into the microphone of a telephone headset by the speaker driver 13.

In normal use, a teleprinter and transceiver would be coupled together on a movable cart and the user would roll the cart to his own telephone and place the telephone handset on the transceiver. Dialing a special number connects his telephone to the central computer, and thereafter communication with the computer is by use of the teleprinter machine.

Referring now to the detailed circuitry of the transceiver receiver circuit 7, the broad and narrow tuned amplifiers 9 and 37 are indicated which, of course, include amplifier sections and filter sections connected in a negative feedback configuration. The same filter theory is applied in the case of the transmitter. Therefore, in these tuned amplifier sections, only the notch frequency is rejected and all other frequencies are passed as negative feedback to thus cause the amplifier to amplify only the notch frequency. The remaining components, such as the preamplifiers, clipper phase splitter and fullwave rectifier, operate in a manner normal in the art and, therefore, will not be described in detail.

The circuit of FIG. 2A and 2B was successfully operated and the following component values and types were used:

Resistor values in ohms

| | |
|---|---|
| R4—4.7K | R25—1K |
| R5—3.3K | R26—62K |
| R6—20K | R27—100 |
| R7—150 | R28—180K |
| R8—5K pot. | R29—62K |
| R9—20K | R30—220 |
| R10—10K pot. | R31—10K |
| R11—33K | R32—82 |
| R12—470 | R33—1K |
| R13—4.7K | R34—20K pot. |
| R14—3.3K | R35—18K |
| R15—10K pot. | R36—10K pot. |
| R16—180K | R37—220K |
| R17—62K | R38—10K |
| R18—220 | R39—15K |
| R19—10K | R40—4.7K |
| R20—18K | R41—4.7K |
| R21—1K | R42—10K |
| R22—20K pot. | R43—10K |
| R23—18K | R44—180K |
| R24—10K pot. | |

Capacitor values in microfarads

| | |
|---|---|
| C4—0.1 | C17—.1 |
| C5—.01 | C18—.0047 |
| C6—.01 | C19—100 |
| C7—.022 | C20—.1 |
| C8—.022 | C21—.0047 |
| C9—.01 | C22—.0047 |
| C10—10 | C23—.01 |
| C11—.0047 | C24—.1 |
| C12—100 | C25—.1 |
| C13—.1 | C26—.1 |
| C14—.01 | C27—.022 |
| C15—.0047 | C28—.01 |
| C16—.0047 | C29—.1 |

| | Type |
|---|---|
| Transistors Q1–Q4, Q6–Q13 | 2N2925 |
| Q5 | 2N1701 |
| Q14 | 2N1303 |
| Diodes CR6–CR12 | 1N3193 |

The following frequencies were used with the above circuit.

Send $f_3$ (space) 1070 Hz. $f_4$ (mark) 1270 Hz.
Receive $f_1$ (space) 2025 Hz. $f_2$ (mark) 2225 Hz.

Thus, the present invention provides an improved transceiver in which, by the use of tuned amplifiers having filter type feedbacks, only a single frequency is used to duplicate the typical teleprinter mark-space code. In addition, a simple method of generating this code has been disclosed. Lastly, the transceiver need not be hard wired to the telephone line, thus enhancing its flexibility.

I claim:

1. A data transceiver for a data transmission system having signal pulses of first and second frequencies wherein the improved receiver portion of said transceiver includes at least one amplifier stage which is tuned to only one of said frequencies, said amplifier including negative feedback means comprising a filter network which passes substantially all frequencies except said one frequency to thereby tune said amplifier to said one frequency said receiver also including phase splitting means coupled to said amplifier for converting the signal output of said amplifier to complementary signals, and rectifier means for rectifying said complementary signals to form a unipotential signal the time duration of which corresponds to the time duration of one of said signal pulses corresponding to said one frequency.

References Cited

UNITED STATES PATENTS

| | | | |
|---|---|---|---|
| 3,361,991 | 1/1968 | Wyndrum | 330—109 XR |
| 3,388,375 | 6/1968 | Sloughter | 179—2 |
| 3,405,368 | 10/1968 | Howe | 330—109 XR |

KATHLEEN H. CLAFFY, Primary Examiner

T. J. D'AMICO, Assistant Examiner

U.S. Cl. X.R.

325—30, 320